Sept. 19, 1961      J. POLAYES      3,000,104
PHOTOCOMPOSING APPARATUS OF STEP-AND-REPEAT TYPE
Filed Oct. 19, 1959
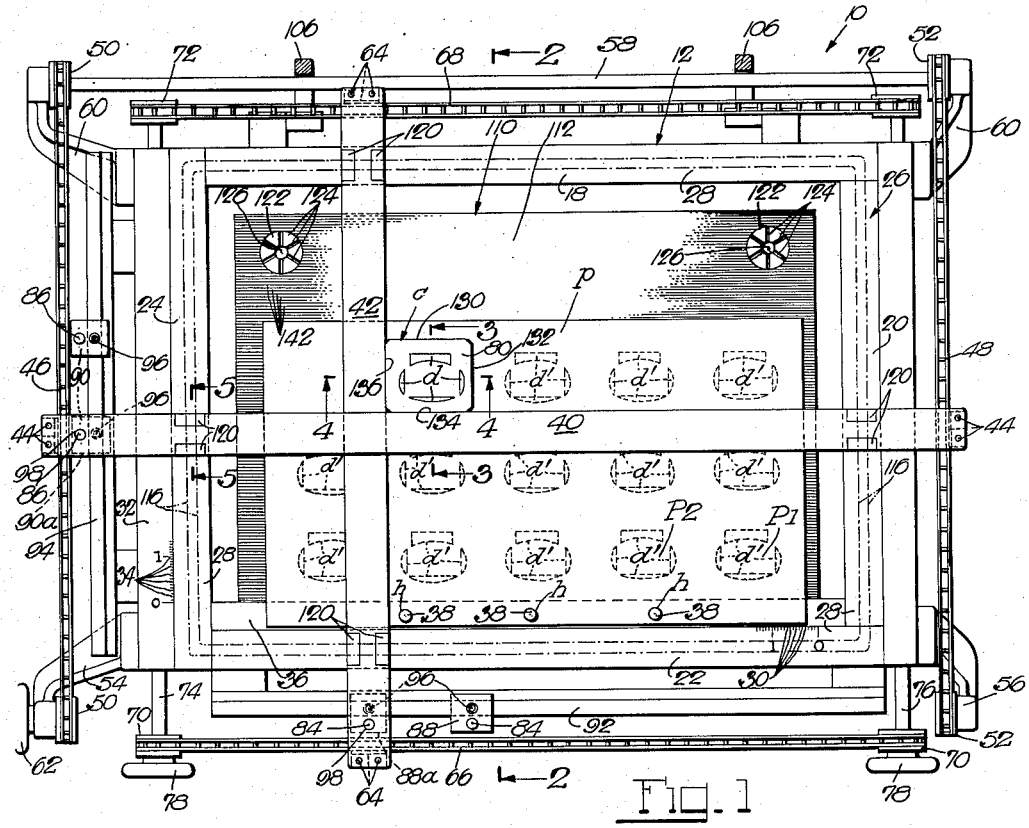
Fig. 1
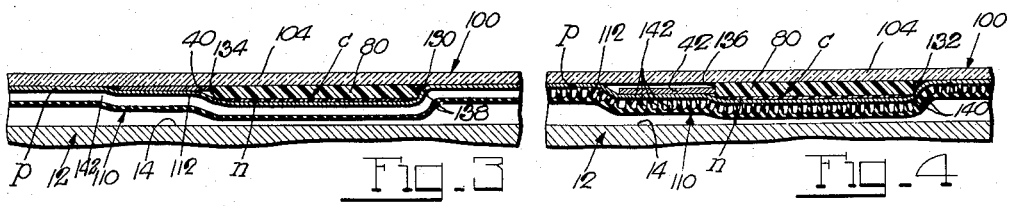
Fig. 3      Fig. 4
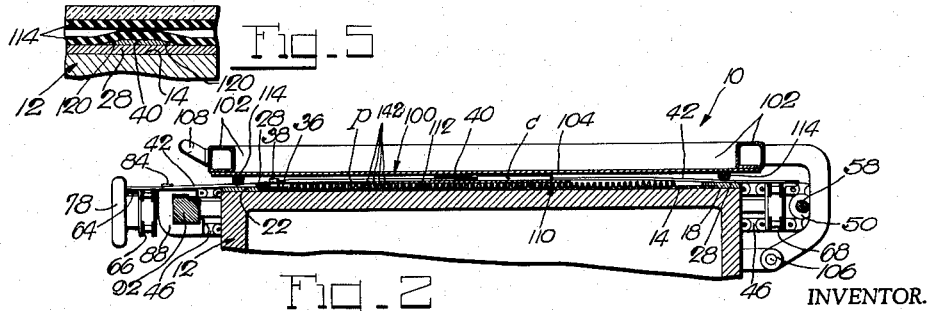
Fig. 5
Fig. 2
INVENTOR.
Jack Polayes
BY
Attorney.

United States Patent Office 3,000,104
Patented Sept. 19, 1961

3,000,104
PHOTOCOMPOSING APPARATUS OF STEP-AND-REPEAT TYPE
Jack Polayes, Westport, Conn., assignor to The Bar-Plate Manufacturing Company, Orange, Conn., a corporation of Connecticut
Filed Oct. 19, 1959, Ser. No. 847,420
2 Claims. (Cl. 33—184.5)

This invention relates to photocomposing apparatus in general, and to photocomposing apparatus of step-an-repeat type in particular.

Apparatus of this type are used primarily, though not exclusively, for stepping negatives or positives on film or directly on printing plates so that they will be in absolute register with each other at subsequent printing stations of a press. To this end, apparatus of this type comprise a table for supporting a film or plate on which to step negatives or positives, the table having usually dowels or other locating means by which identically to coordinate successive films or plates with the stepping provisions of the apparatus. Slidable into any relative position on the table are horizontal and vertical straight-edges which serve as reference stops or locators for chases in properly stepped positions on a film or plate on the table. These chases, which are made up of the negatives or positives to be stepped and transparent, usually plastic, rectangular backing plates therefor, are for their location in proper stepped positions on films or plates on the table placed with two adjacent edges against the horizontal and vertical straightedges after the latter have themselves been correctly stepped or located on the table to this end. Correct stepping of the horizontal and vertical straight edges to this end may be achieved with the aid of adjacent scales or, preferably, by means of adjustable dowels with which these straightedges are associated and registerable in releasable interlock therewith. Once a chase is thus located in proper stepped position on a film or plate on the table, a transparent cover is closed on the table to hold the chase in its stepped position for photocomposing its negative or positive on the film or plate. The cover is then opened and the straightedges are stepped into the next relative position on the table for accurate location of the same or another chase in the next correct stepped position on the film or plate on the table for the next photocomposition thereon. This procedure is repeated until the film or plate on the table has received the intended number of stepped photocompositions, whereupon the next film or plate of the same series may be processed in the apparatus in the same manner.

Prior apparatus of this type are generally satisfactory in their performance, but they were found to be deficient in one important respect in that they permit occasional misplacement of a chase from the properly located straightedges which are to locate it in correct stepped position, thereby spoiling the entire film or plate because of its ruined register. Misplacement of a chase from the properly located straightedges may be due to overly hasty or careless stepping of the chase from one position to the next or due to other accidental causes, and is frequently not noticed or even unnoticeable, yet even the slightest misplacement of the chase from the straightedges spoils the entire film or plate because of its ruined register.

It is an object of the present invention to make provisions in apparatus of this type for releasably locking a chase to the horizontal and vertical straightedges so that the latter will retain the chase in correct stepped position on the film or plate on the table for the length of time required for obtaining the photocomposition thereon.

It is another object of the present invention to make provisions in apparatus of this type not only for releasably locking a chase to the horizontal and vertical straightedges but even to shift the chase into uniform engagement with these straightedges on noticed or unnoticed misplacement of the former from the latter.

It is a further object of the present invention to provide apparatus of this type with a flexible mat on the table on which to place the film or plate and on which to step the straightedges and a chase or chases, and to further provide for a partial vacuum in the space between the mat and the closed cover on the table, thereby to draw the mat and the superposed film or equally flexible plate thereon against the closed cover wherever they are exposed thereto and, in consequence, wedge the chase at its edges remote from the straightedges toward the latter. With this arrangement, the wedge action just described on the chase will not only securely lock the same to the straightedges if correctly placed against the latter in the first place, but will actually shift or float the chase into uniform engagement with the straightedges if the former has initially been misplaced from the latter. The automatic wedge action on the chase toward the straightedges the moment a partial vacuum is applied beneath the closed cover, while clearly incapable of floating the chase against the straightedges from gross and readily noticeable misplacement therefrom, is fully capable to float, and will assuredly float, the chase against the straightedges from hardly noticeable and even unnoticeable misplacement therefrom. Since it is the latter category of hardly noticeable and unnoticeable misplacement of the chase from the straightedges which almost always is responsible for spoiled films or plates due to ruined register, and since gross misplacement of the chase from the straightedges is usually spotted in time for correction, the automatic wedge action on the chase toward the straightedges on application of a partial vacuum beneath the closed cover is fully and even ideally suited effectively and automatically to correct such misplacement of the chase from the straightedges which hitherto was responsible for almost all spoiled films or plates due to ruined register.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a top view of step-and-repeat apparatus embodying the present invention;

FIG. 2 is a fragmentary section through the apparatus substantially as taken on the line 2—2 of FIG. 1; and FIGS. 3, 4 and 5 are enlarged fragmentary sections taken on the lines 3—3, 4—4 and 5—5, respectively, of FIG. 1.

Referring to the drawings, and more particularly to FIGS. 1 and 2 thereof, the reference numeral 10 designates step-and-repeat apparatus having a table 12 with a plane top or support surface 14 of presently rectangular outline. Suitably secured to the table top 14 are machined flat bars 18, 20, 22 and 24 which abut and are flush at their adjacent ends and combine to form a rectangular frame 26 with a plane top surface 28. The flame bar 22 is presently provided substantially throughout its longitudinal expanse with scale graduations 30 with which to measure linear dimensions in the longitudinal or horizontal direction of the table 12. Suitably secured to the table top 14 alongside the frame bar 24 is another bar 32 having similar scale graduations 34 with which to measure linear dimensions in the transverse or vertical direction of the table 12. Further suitably secured to the table top 14, and extending alongside and being presently flush with the front frame bar 22, is a reference bar 36 having in the present instance a plurality of spaced reference pins or dowels 38 for a purpose to be described.

Slidable on the top surface 28 of the frame 26 are rectangularly disposed horizontal and vertical straightedges 40 and 42 which are guided for movement at right angles to each other. To this end, the horizontal straightedge 40 is with its opposite ends suitably secured at 44 to drive chains 46 and 48 which pass over sprockets 50 and 52, respectively. The front sprockets 50 and 52 are journalled in suitable bearing brackets 54 and 56, respectively, at the opposite ends of the table 12, while the rear sprockets 50 and 52 are carried by a shaft 58 which is journalled in suitable bearing brackets 60 on the table 12. Either one of the front sprockets 50 or 52, presently the sprocket 50, is provided with a knob or handwheel 62 with which simultaneously to drive both chains 46 and 48 and slide the horizontal straightedge 40 into any position on the table 12. The vertical straightedge 42 is with its opposite ends suitably secured at 64 to front and rear drive chains 66 and 68 which pass over sprockets 70 and 72, respectively. The sprockets 70, 72 at one end of the table 12 are carried by a shaft 74, and the sprockets 70, 72 at the opposite end of the table are carried by a shaft 76, with both shafts 74 and 76 being suitably journalled in the table 12. Both front sprockets 70 are presently provided with handwheels 78 either one of which may be manipulated simultaneously to drive both chains 66, 68 and slide the vertical straightedge 42 into any position on the table 12.

Among the various uses of the present apparatus is the exemplary one of photocomposing from a chase c onto a plate p which may be a metal plate or film. Assuming that the plate p is a well known highly flexible metal printing plate for direct application to a printing press cylinder, the sensitized face of the same will have to receive positive photocompositions for its further well-known treatment for printing use, in which case the chase c bears a negative for a positive photocomposition on the plate p. The chase c is conventional, presently bearing a negative n on a transparent, usually plastic backing plate 80 (see also FIGS. 3 and 4). The negative n presently shows an arbitrary design component d which is to be stepped as positives d' on the plate p. The plate p may be but one of a series of identical plates the different design components of which together define finished designs for printing, with the design components on the several plates being complementary with each other and intended for different color printing, for example. Under the circumstances, the several plates are to be applied to successive printing press cylinders for different color printing thereat, and this explains the great need for accurate register of these plates in the printing press. In order that these plates may eventually be brought into accurate register with each other in a printing press, it is, of course, imperative that the design components of all plates are initially brought into accurate register with each other. To this end, all plates receive punched-out reference holes h, presently three, which are accurately coordinated with the edges of the plates so that all plates will identically be positioned on the table 12 when they are received with their reference holes h by the dowels 38 on the reference bar 36. Now, since the chase c and subsequent chases of different design components are to be located by the horizontal and vertical straightedges 40 and 42 (FIG. 1) in the correct stepped positions on the plates, it is merely necessary to provide for corresponding accurate stepping of the straightedges themselves for each plate. To this end, recourse may be had to the horizontal and vertical scales 30 and 34 on top of the table 12 by which accurately to gauge the stepping of the vertical and horizontal straight edges, respectively. However, the horizontal and vertical straightedges 40 and 42 are preferably located in their successive stepped positions by dowel pins 84 and 86 on preset stops 88 and 90 on horizontal and vertical track bars 92 and 94, respectively, which are suitably mounted at the front and one side of the table 12 in spaced relation therewith.

Each of these stops is guided for sliding movement on its respective track bar (FIG. 2) and has a set screw 96 (FIG. 1) with which releasably to clamp the stop to its track bar in any adjusted position thereon. Only a few of these stops are shown and these are not even coordinated for correct stepping of the straightedges in the present example, but it will be understood that any number of these stops may be provided on the respective track bars and that they may be adjusted thereon for accurate stepping of the respective straightedges in the present exemplary step-and-repeat operation or any other. Track bars and adjustable stops thereon may also be provided on the rear and remaining side of the table 12 so that the dowels on the stops will locate both ends of the respective straightedges in stepped positions of optimum accuracy. In the present example, the vertical and horizontal straightedges 42 and 40 are accurately located in the respective stepped positions shown in FIG. 1 by having reference holes 98 in one end thereof received by dowels 84 and 86 on properly adjusted stops 88a and 90a on the track bars 92 and 94, respectively.

The present apparatus also provides a top gate 100 (FIG. 2) which presently consists of a rectangular frame 102 and a transparent cover 104 of glass or the like, with the frame 102 being hinged at 106 to the table 12 at the rear thereof for closing and opening the cover 104 on the table. The top gate 100, which is omitted in FIG. 1, is shown in FIG. 2 in closed position on the table in which its cover 104 would ordinarily bear against and hold the chase c in a correctly stepped position on the located plate p on the table, the top gate and table preferably having to this end suitable provisions (not shown) for releasably locking the gate in its closed position. The top gate 100, which may normally be urged into its open position by suitable spring means (not shown), is provided with suitable handle means 108 (FIG. 2) for closing it on the table.

In operation, the chase c is, in a selected first stepped position determined by the prior location of the straightedges 40 and 42, placed with its negative n against the exposed sensitized surface of the correctly located plate p, say at the position P1 (FIG. 1), for example, for the first positive photocomposition d' thereat of the design component d. To this end, the entire area of the sensitized plate surface, save that which is to receive the first design component d', is masked at the top with a suitable masking sheet (not shown), whereupon the gate 100 is closed and the transparent cover 104 and parts underneath subjected to artificial exposure light for a sufficient length of time to complete the first photocomposition on the plate p. The cover 100 is then opened and the masking sheet removed, whereupon the straightedges are stepped for the next stepped position of the chase on the plate, which could be the position P2 (FIG. 1) so as to require only stepping of the vertical straightedge 42 for locating the chase in this next stepped position as well as in the remaining stepped positions for all the photocompositions in the same horizontal row on the plate p. On thus stepping the vertical straightedge 42 for locating the chase in the stepped position P2 on the plate and placing the chase into this position as well as masking the entire plate except the part thereof which is to receive the next photocomposition, the gate 100 is again closed and the transparent cover 104 and parts underneath subjected to exposure light for the second photocomposition on the plate. These steps are repeated until the entire plate has the requisite number of photocompositions d', the horizontal straightedge 40 being in the process stepped only on transferring from one horizontal row of photocompositions on the plate to the next, as will be readily understood.

The step-and-repeat apparatus described so far may be entirely conventional and forms no part of the present invention except insofar as it enters into combination therewith.

In accordance with the present invention, there is provided on the table top 14 a flexible mat 110 which on closure of the top gate 100 is to lock the chase c by vacuumatic action against the straightedges 40, 42 which locate it in any of its correct stepped positions. More importantly, the flexible mat 110, by the same vacuumatic action, is to float or shift the chase into uniform engagement with the straightedges whenever the former has accidentally been misplaced from the latter, particularly to a hardly noticeable or unnoticeable extent which, if not corrected, would nevertheless result in spoilage of the entire plate p due to ruined register of the photocomposition thereon from the misplaced chase. To this end, the flexible mat 110, which is air-impervious and may be of rubber on a suitable backing, is with a continuous margin thereof clamped in sealed fashion to the table top 14 by the frame bars 18, 20, 24 and the reference bar 36, leaving the part of the mat within this margin free to flex from the table top on subjecting the mat at its top face 112 to a partial vacuum. To hold the partial vacuum on top of the mat 110 for the intended purpose, the space between this mat and the top gate 100 in its closed position must be sealed from the atmosphere, and the transparent cover 104 is to this end provided with a continuous, preferably resiliently compressible, seal 114 which may be of well-known tubular type (FIG. 5). The seal 114, presently of rectangular outline, is suitably bonded to the transparent cover 104, and on closure of the top gate 100 bears in sealing fashion against the plane top surface 28 of the frame bars 18, 20, 22 and 24 in a fashion like or similar to that outlined at 116 in dot-and-dash lines in FIG. 1, with the seal 114 also crossing the straightedges 40 and 42 thereat. Since the seal 114 is of resiliently compressible type, it will effectively maintain its sealing function even where crossing the straightedges 40 and 42, the latter being at the seal crossings preferably beveled on opposite sides as at 120 (see also FIG. 5) to enhance the sealing function of the seal 114 thereat.

Leading from air-evacuation terminals 122 in the space between the mat 110 and closed top gate to a vacuum source, such as a vacuum pump, are conduit means with an interposed manual valve (neither shown) for providing and intercepting communication through the former on manipulation of the latter. The air-evacuation terminals 122, presently two in number and located along the rear margin of the mat 110, are relatively flat discs having narrow and relatively deep radial channels 124 leading to central holes 126 so as to evacuate air from the sealed space between the mat and closed top gate even if these terminals should be partially or entirely covered by a plate p larger than that shown in FIG. 1.

While the general operation of the present apparatus remains the same as previously described, the same is augmented in the following respects by virtue of the flexible mat 110 with its vacuumatic action. Thus, on closing the top gate 100 after all steps were taken for a photocomposition from the chase c in a certain stepped position onto the plate p, the aforementioned valve is manipulated for the evacuation of air from the sealed space between the mat 110 and the closed gate, with the result that the ensuing partial vacuum in this space will draw the mat toward, and wherever possible against, the transparent cover 104, it being the flexible part of the mat which must yield to the partial vacuum since the transparent cover 104 cannot yield inwardly once the seal 114 on the gate is seated on the table and the gate releasably locked in its closed position. In consequence, the mat 110 will tend to raise all superposed parts thereon against the transparent cover 104 and will do so wherever possible. In this connection, the vacuumatic action on the mat 110 will definitely succeed in causing the latter to raise the plate p and superposed chase c thereon against the cover 104 (FIGS. 3 and 4), and may or may not succeed to raise the straightedges 40 and 42 toward this cover 104 depending on their weight. Prior to the application of the partial vacuum to the sealed space between the mat and closed gate the mat rests against the table top 14 (FIG. 2) with the highest superposed part on the mat, namely the chase c, having more or less slight clearance from the closed cover 104 so as to be freely floatable therebeneath. On applying a partial vacuum to the sealed space between the mat and closed gate, the mat will be drawn toward the closed cover 104 wherever possible, taking with it at least the superposed plate p and chase c until they bear against the cover 104. However, since the plate p is not only much thinner than the chase c but is also highly flexible, the mat 110 will force the plate rather abruptly against the cover 104 in close proximity to and where clearing the edges 130 and 132 of the chase opposite to the edges 134 and 136 thereof which are next to the straightedges 40 and 42 (FIGS. 1, 3 and 4). As a result, the abruptly bent plate and mat portions 138 and 140 at the chase edges 130 and 132, respectively, produce wedge actions on the chase which definitely lock the latter to the straightedges 40, 42 if initially uniformly placed thereagainst, and which shift the chase into and lock it in uniform engagement with either or both straightedges if initially misplaced therefrom to a slight extent and even to a hardly noticeable extent. While due to the vacuumatic draw of the mat and all superposed parts thereon toward the cover 104, the plate and mat also bend somewhat around the chase edges 134 and 136 next to the straightedges 40 and 42 (FIGS. 3 and 4), the ensuing wedge action on these chase edges away from the straightedges is much smaller than and is rendered ineffectual by the much larger wedge action on the other chase edges toward the straightedges. Since gross misplacement of the chase from the straight edges is almost invariably noticed and corrected, and since it is misplacement difficult to notice, and even unnoticeable misplacement, of the chase from the straightedges which almost invariably are responsible for spoiled plates due to ruined register, it stands to reason that the present mat 110 with its vacuumatic action serves admirably to prevent, automatically, spoilage of plates due to ruined register.

Last, but by no means least, the mat 110 is over the greater part of its exposed top face 112 ribbed throughout as at 142, presently longitudinally of the table. These ribs 142 not only serve to reduce friction between the mat and plate so that the latter may under vacuumatic action mold itself around the chase with the least resistance (FIGS. 3 and 4), but they also provide a multiplicity of communication channels for a partial vacuum throughout the plate for assured vacuum application at and near the chase.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In step-and repeat apparatus for photocomposing from a chase part onto a flexible plate part, the combination of a support having a plane surface; a flexible air-impervious front-exposed mat normally backed at its rear against said surface and being flexible therefrom; two crossing flexible straightedges mounted on said support for sliding movement at right angles to and on each other and over the front of said mat throughout its expanse; a transparent cover movable into and from a closed position on the front of said mat in which it clears said straightedges and a pair of superposed plate and chase parts on said mat; means for applying a partial vacuum in the space between said mat and said cover in its closed position; and means for sealing said space from the atmosphere so that on application of a partial vacuum therein said mat and superposed parts thereon will be drawn against said cover, and the chase part in substantial edge-to-edge abutment with both straightedges will also be wedged against the latter by said mat and interposed plate part.

2. In step-and-repeat apparatus for photocomposing from a chase part onto a flexible plate part, the combination of a plane support surface; a flexible air-impervious front-exposed mat on said surface within a continuous outer margin of the latter, with said mat being with a continuous outer margin thereof secured to said surface in sealed fashion for freedom of the remainder of the mat to flex away from said surface; rectangularly disposed straightedges slidable on said mat and surface margins at right angles to each other; a transparent cover movable into and from a closed position in which it extends over said mat and into the confines of said outer surface margin throughout and clears said straightedges and a pair of superposed plate and chase parts on said mat; means for applying a partial vacuum in the space between said mat and surface margin and said cover in its closed position; and an endless resiliently compressible gasket carried by said cover at its outer margin and seated against said surface margin on movement of said cover into its closed position for sealing said space from the atmosphere so that on application of a partial vacuum therein said remainder of the mat and superposed parts thereon will be drawn against said cover, and the lengths of said straightedges in the path of said gasket are transversely beveled to permit the latter to bridge them thereat in sealing fashion.

References Cited in the file of this patent

UNITED STATES PATENTS

| | | |
|---|---|---|
| 2,689,411 | Huck | Sept. 29, 1954 |
| 2,711,031 | Kessler | June 21, 1955 |
| 2,822,736 | Padgett | Feb. 11, 1958 |